March 31, 1959     R. T. ANDERSON     2,879,967
HOLDER FOR EYEGLASSES
Filed May 24, 1957
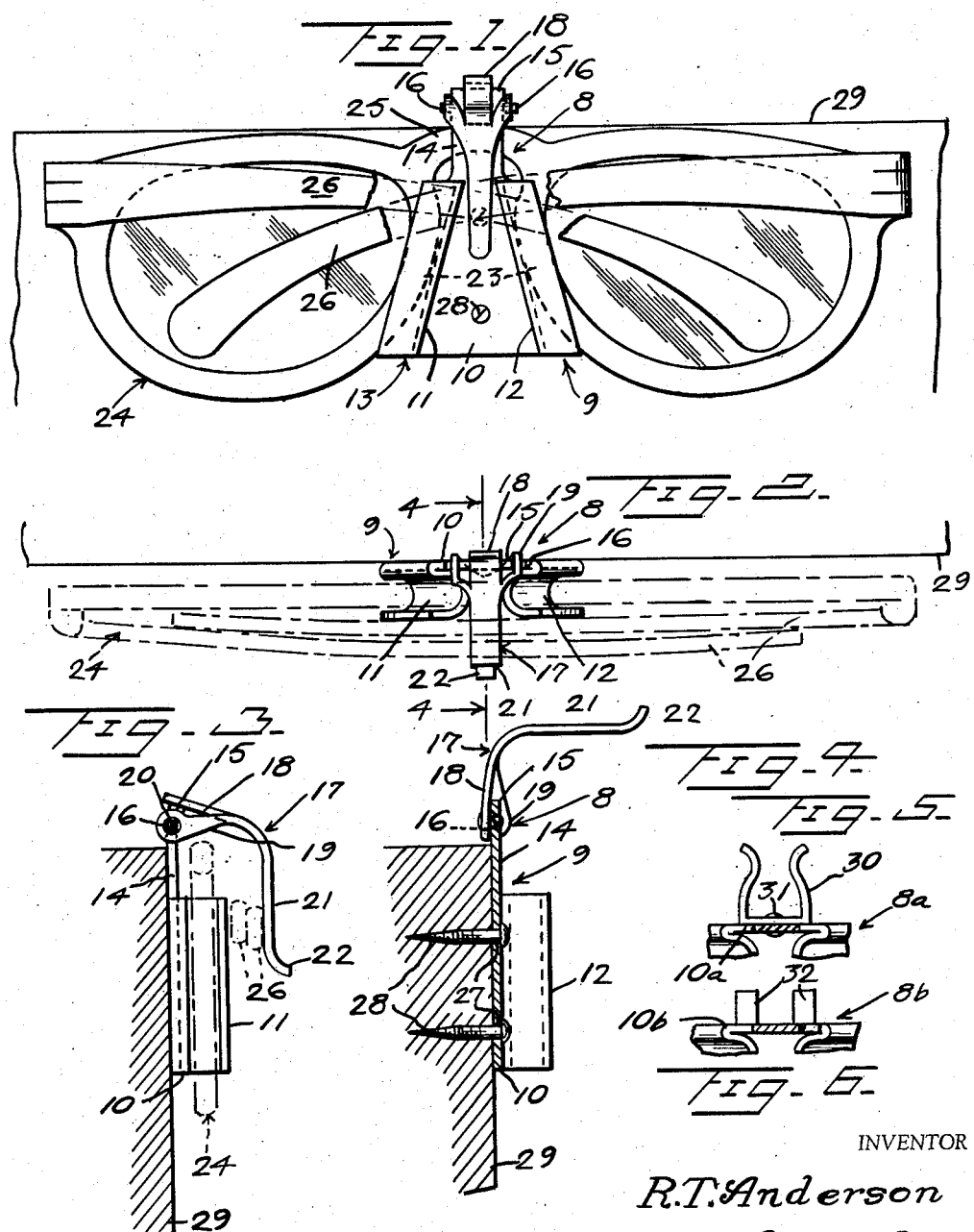
INVENTOR
R. T. Anderson
BY *John N. Randolph*
ATTORNEY 2,879,967

HOLDER FOR EYEGLASSES

Robert T. Anderson, Valley Springs, Calif.

Application May 24, 1957, Serial No. 661,366

3 Claims. (Cl. 248—316)

This invention relates to an eyeglass holder and more particularly to a holder for sunglasses or goggles although capable of supporting other conventional types of eyeglasses or spectacles.

More particularly, it is a primary object of the present invention to provide a holder which may be mounted in a convenient position in a vehicle, such as an automobile, truck, tractor or airplane, for supporting a pair of eyeglasses or goggles in a position convenient to the vehicle operator or a passenger, and from which the eyeglasses or goggles can be readily removed, or to which the eyeglasses or goggles may be readily applied.

Still another object of the invention is to provide a holder capable of holding the eyeglasses or goggles substantially immovable relative to the holder, even though the holder is subjected to substantial vibration, and which will not scratch the lenses of the eyeglasses, or mar or otherwise damage the frame thereof.

Still a further object of the invention is to provide a holder of extremely simple construction which may be very economically manufactured and sold, which can be quickly and easily applied to a part on which the holder is to be supported, which is capable of fitting eyeglasses or goggles of a variety of shapes, and which is composed of a minimum number of parts.

Various other objects and advantages of the invention will hereinafter become more fully apparent from the following description of the drawing, illustrating presently preferred embodiments thereof, and wherein:

Figure 1 is a front elevational view of the holder with a pair of eyeglasses applied thereto;

Figure 2 is a top plan view of the holder;

Figure 3 is an end elevational view thereof looking from left to right of Figure 2;

Figure 4 is a partial vertical sectional view of the holder, taken substantially along a plane as indicated by the line 4—4 of Figure 2, and showing the holder in an open position;

Figure 5 is a fragmentary top plan view, partly broken away, illustrating a slightly modified form of the holder, and Figure 6 is a similar view of another modified form of the holder.

Referring more specifically to the drawing and first with reference to Figures 1 to 4, the rack-type eyeglass holder as disclosed therein and in its entirety is designated generally 8 and includes a body member, designated generally 9, formed from an elongated strip of metal the end portions of which are folded back relative to a substantially flat intermediate portion 10 of the body member 9, and which end portions are then folded outwardly and away from one another to form two corresponding channels 11 and 12 which extend from top to bottom of the intermediate portion 10 and which are disposed to open away from one another. Said outwardly opening channels 11 and 12 are disposed in downwardly diverging relation to one another and combine with one another to form a saddle, designated generally 13. The two channels 11 and 12 of the saddle 13 are each of substantially U-shape cross section, as best seen in Figure 2, and are disposed on a front side of the flat intermediate portion or base 10 of the body member 9. Said body member 9 is also provided with a standard portion 14 which forms an integral extension of and projects upwardly from the intermediate portion of the upper edge of the base 10 and which is provided, adjacent to but spaced from the upper edge 15 thereof, with aligned trunnions or pivots 16 which extend outwardly from the side edges of the standard 14.

The holder 8 also includes a spring clip 17 which is likewise formed from a single elongated strip of metal, one end of which is wider than the other end thereof, and which wider end is cut longitudinally from the terminal thereof along two parallel lines to form a central portion constituting a leaf spring 18 and corresponding side portions 19 which are bent downwardly relative to the spring strip 18 and which form bearings having substantially parallel terminal portions in which are provided openings 20. The terminals of the bearings 19 straddle the side edges of the standard 14 and the trunnions 16 extend outwardly through the bearing openings 20 for pivotally mounting the clip on the standard 14. The other end portion 21 of the clip 17 is disposed at nearly a right angle to the leaf spring 18 and is provided with an outturned terminal 22 forming a finger-hold.

From the foregoing it will be readily apparent that the spacing between the upper portions of the channels 11 and 12 of the saddle 13 is substantially less than the spacing between the lower portions of said channels. Accordingly, with the clip 17 in a raised, open position as seen in Figure 4, it will be readily apparent that the nosepiece portions 23 of a pair of eyeglasses or goggles 24 may be positioned above the saddle 13, after which by simply lowering the eyeglasses or goggles 24, the nosepieces 23 will assume positions in the channels 11 and 12 and, due to their downwardly divergent disposition with respect to one another, said nosepiece portions 23 will assume positions in snug fitting engagement in the channels 11 and 12, and with the bridge 25 of the eyeglasses or goggles disposed above the upper end of the saddle 13. The eyeglasses or goggles 24 as thus applied to the holder 8 will be supported by the holder and may be readily removed therefrom by merely lifting upwardly on the eyeglasses to disengage the nosepieces 23 from the channels 11 and 12, after which the eyeglasses can be displaced away from the holder 8. However, to hold the eyeglasses or goggles steady in the holder 8, even if such holder is subjected to considerable vibration, and to maintain the earbows 26 of the eyeglasses in a folded position, said earbows are folded inwardly to closed positions against the upper portion of the saddle 13 and the spring clip 17 is then swung downwardly to its operative position of Figures 1 to 3. The spring clip 17 is maintained in a raised, inoperative position, as seen in Figure 4, by the leaf spring 18 thereof bearing against the backside of the upper portion of the standard 14. When the spring clip 17 is forcibly swung downwardly the leaf spring 18 thereof will be flexed outwardly by sliding contact with the upper edge 15 of the standard. Said upper edge 15 maintains the leaf spring 18 under tension when the clip 17 is swung downwardly to its operative position and thus urges the clip to remain in its lowered operative position of Figure 3 with a part of the clip portion 21 bearing against one of the earbows 26 to maintain the earbows closed and between the clip portion 21 and the saddle 13. The clip 17 in its lowered position will prevent a sufficient upward displacement of the eyeglasses 24, so that said eyeglasses could be removed from the holder 8, and the frictional contact of the clip 17 with the earbows 26 will maintain the eyeglasses immovable in the holder against any ordinary vibration to which the holder may be subjected. Thus, the spring 18 acts as an over-center spring to maintain the clip 17 in either its raised inoperative position of Figure 4 or in its lowered operative position of Figures 1 to 3.

The holder 8, as shown in Figures 1 to 4, is provided with openings 27 in its base portion 10 to receive screws or other driven fastenings 28 for anchoring the side of said base 10, located opposite to the side thereof on which the saddle 13 is disposed, against a supporting bar or strip 29, which may constitute a part of a vehicle. It will be apparent that the holder 8 does not necessarily have to be disposed vertically as shown in Figures 1 to 4.

Figure 5 shows a slight modification of the holder, designated generally 8a and which differs from the holder 8 only in that the base portion 10a thereof is not provided with the openings 27. Rather, a spring clip 30 is secured by one or more rivets or similar fastenings 31 against the rear side of the base 10a and projects outwardly therefrom for releasably clamping the holder 8a to any suitable supporting bar, rod or other convenient element, not shown.

Figure 6 illustrates another modification of the holder and wherein the holder, designated generally 8b, instead of being provided with the openings 27 or the spring clip 30, has a pair of permanent magnets 32 suitably secured to the rear side of the base 10b thereof and which may be connected by magnetic attraction to any metal surface, not shown, capable of being attracted by the magnets 32, for thus supporting the holder 8b.

Various other modifications and changes are contemplated and may be resorted to, without departing from the function or scope of the invention as hereinafter defined by the appended claims.

I claim as my invention:

1. A rack-type holder for eyeglasses and goggles comprising a pair of elongated channel members disposed in downwardly diverging relation to one another and positioned to open away from one another, and a connecting member extending between and connected to said channel members, said channel members being of rigid construction and being rigidly supported relative to one another by the connecting member, said channel members being adapted to be engaged by the nosepieces of a pair of eyeglasses or goggles for supporting the eyeglasses or goggles on the holder, said holder being formed from a single elongated strip having end portions forming said channel members and an intermediate portion forming the connecting member, said connecting member being disposed to one side of and underlying corresponding sides of said channel member and forming a substantially flat base.

2. A rack-type holder for eyeglasses and goggles comprising a pair of elongated channel members disposed in downwardly diverging relation to one another and positioned to open away from one another, and a connecting member extending between and connected to said channel members, said channel members being of rigid construction and being rigidly supported relative to one another by the connecting member, said channel members being adapted to be engaged by the nosepieces of a pair of eyeglasses or goggles for supporting the eyeglasses or goggles on the holder, said connecting member being connected to corresponding side edges of said channel members whereby the connecting member is disposed on one side of said channel members, said connecting member including a standard portion extending upwardly from the upper ends of the channel members, a clip, journal means pivotally mounting said clip on an upper portion of the standard for swinging movement of the clip from a raised, inoperative position downwardly and inwardly toward said channel members and toward the connecting member and to a lowered, operative position, said clip having a portion adapted to engage the earbows of the eyeglasses or goggles supported by the channel members for retaining the earbows in folded positions against portions of the other side edges of the channel members when the clip is in a lowered operative position.

3. A rack-type holder for eyeglasses and goggles comprising a pair of elongated channel members disposed in downwardly diverging relation to one another and positioned to open away from one another, and a connecting member extending between and connected to said channel members, said channel members being of rigid construction and being rigidly supported relative to one another by the connecting member, said channel members being adapted to be engaged by the nosepieces of a pair of eyeglasses or goggles for supporting the eyeglasses or goggles on the holder, said holder being formed from a single elongated strip having end portions forming said channel members and an intermediate portion forming the connecting member, said connecting member being disposed to one side of and underlying corresponding sides of said channel members and forming a substantially flat base, said base having an integral upwardly projecting extension forming a standard, a clip, means pivotally connecting said clip to an upper portion of the standard for swinging movement downwardly and inwardly toward said channel members to a lowered, operative position overlying portions of the eyeglasses or goggles to prevent upward displacement of the nosepieces thereof out of engagement with said channel members and for retaining the earbows thereof in folded positions against said channel members, said clip being swingable upwardly to a raised, inoperative position out of engagement with the eyeglasses or goggles to permit upward displacement of the eyeglasses from the holder.

References Cited in the file of this patent

UNITED STATES PATENTS

| | | |
|---|---|---|
| 553,325 | Zestermann | Jan. 21, 1896 |
| 811,487 | Davidson | Jan. 30, 1906 |
| 1,931,286 | Drew | Oct. 17, 1933 |
| 2,203,402 | Bausch | June 4, 1940 |
| 2,541,962 | Healey | Feb. 13, 1951 |
| 2,728,968 | Scharff et al. | Jan. 3, 1956 |